United States Patent [19]
Lagemann et al.

[11] Patent Number: 5,637,379
[45] Date of Patent: Jun. 10, 1997

[54] FABRIC FOR STRENGTHENING AND/OR REINFORCING FLAT-SHAPED ARTICLES

[75] Inventors: Bernd Lagemann, Waldshut-Tiengen; Friedrich Mathias; Peter Wisniewski, both of Klettgau-Erzingen, all of Germany

[73] Assignee: Synteen Gewebe Technik GmbH, Klettgau-Erzingen, Germany

[21] Appl. No.: 225,567

[22] Filed: Apr. 11, 1994

[30] Foreign Application Priority Data

May 19, 1993 [DE] Germany .......................... 9307658 U

[51] Int. Cl.$^6$ .................................................. B32B 23/02
[52] U.S. Cl. ......................... 428/193; 428/192; 428/212
[58] Field of Search .................................. 428/192, 193, 428/255, 212, 257

[56] References Cited

U.S. PATENT DOCUMENTS

| | | | |
|---|---|---|---|
| 2,263,172 | 11/1941 | Heberlein | 428/193 |
| 3,515,623 | 6/1970 | Bates | 428/193 |
| 3,539,435 | 11/1970 | Williams | 428/193 |
| 4,125,964 | 11/1978 | Waggoner | 428/193 |
| 4,384,021 | 5/1983 | Aoyama | 428/193 |
| 4,501,782 | 2/1985 | Weatherly et al. | 428/193 |
| 5,132,163 | 7/1992 | Leaderman et al. | 428/192 |
| 5,178,923 | 1/1993 | Andrieu et al. | 428/192 |

*Primary Examiner*—James J. Bell
*Attorney, Agent, or Firm*—Bachman & LaPointe, P.C.

[57] ABSTRACT

A fabric for strengthening flat-shaped articles consisting of warp threads and woof threads which form a basic fabric having a connected edge area which is strengthened relative to the basic fabric.

16 Claims, 2 Drawing Sheets

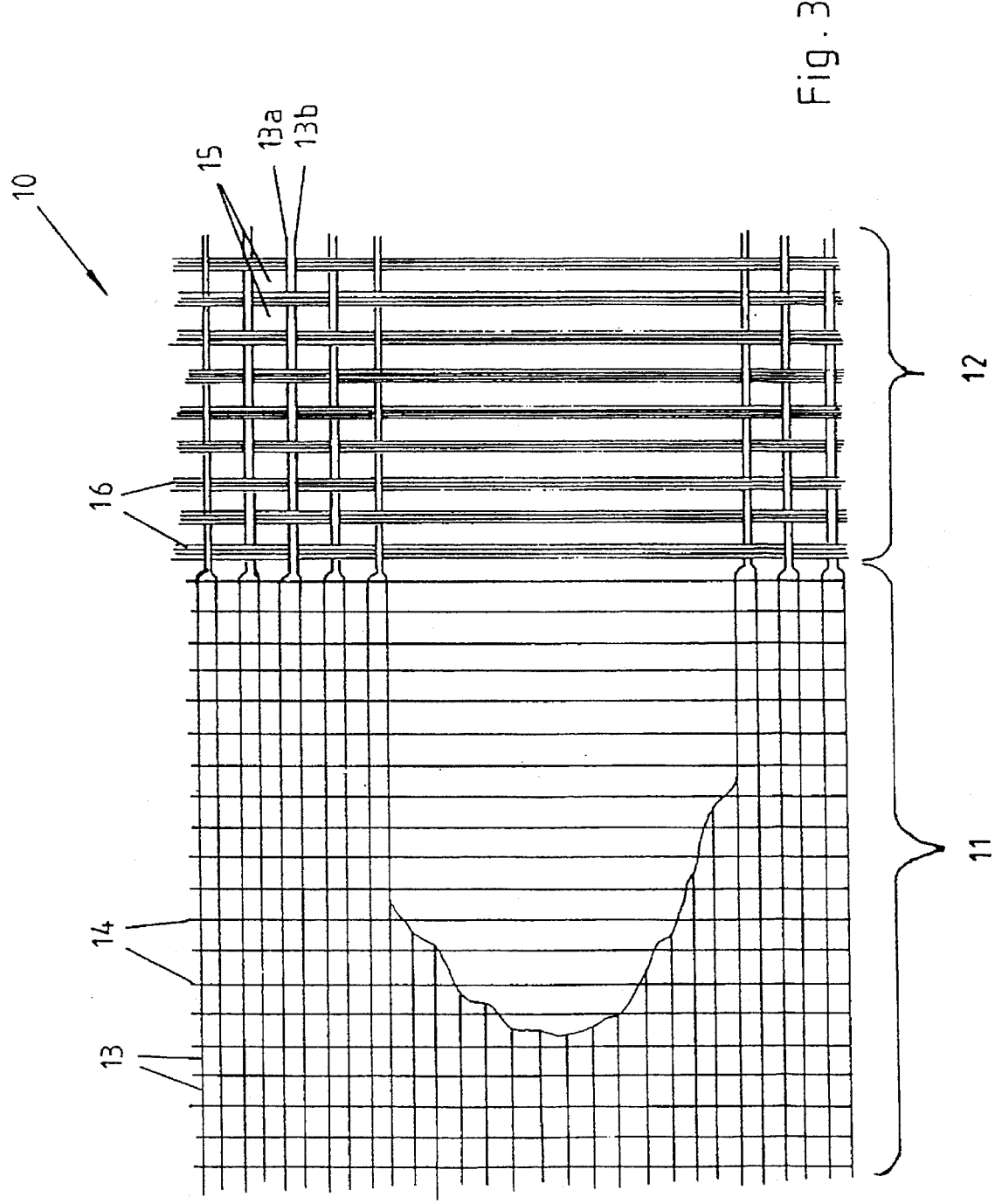

FABRIC FOR STRENGTHENING AND/OR REINFORCING FLAT-SHAPED ARTICLES

The invention concerns a fabric for strengthening and/or reinforcing flat-shaped articles, in particular, synthetic roofing and building papers, made of woof and warp threads which form open spaces with one another.

A large number of flat-shaped articles today use fabrics for strengthening and/or reinforcing which are embedded in these flat-shaped articles. For example, road construction in which special fabrics are embedded in the bitumen layer should be mentioned here. Also fabrics serve for slope reinforcement on roads or as plaster reinforcement. Thus, in the case under consideration, the term fabric is to be understood as meaning all flat-shaped articles which are produced by weaving, knitting, raschel warp knitting, or the like, or exist as laid fabric, fleece, et cetera.

In many cases the strengthening and/or reinforcing fabric has a high tensile strength and/or a specific force/elasticity behavior. In particular, this is true of the edge area. Synthetic roofing and building papers are given as examples in the case under consideration. These papers are closed synthetic flat-shaped articles in which a fabric is embedded for strengthening and reinforcing. As a rule, this fabric consists of spaced woof and warp threads which cross and form open areas between them which are filled and covered by the material of the flat-shaped article. These papers are exposed to considerable mechanical stresses so that significant requirements also are imposed on the fabric insert. In this case stresses appear both in the longitudinal and in the transverse directions, which may lead to tearing, tear propagation, and the fabric insert and/or the entire paper being torn through.

For example, the above-mentioned synthetic roofing and building papers to which, of course, the invention under consideration is not to be limited in any way, are laid onto a corresponding substrate in papers of different widths and glued all over. This type of application of papers, however, is becoming less and less important since considerable loading and weighting problems result in the case of gluing in order to avoid hollow spaces. Further, a uniform glue application requires a large amount of glue which is lost in joints and depressions. If a moisture barrier is needed, an additional intermediate layer is required so that this type of roof construction is expensive and complicated.

Therefore, mechanical reinforcing systems are used increasingly today for reinforcing building papers. In this case the edges of the papers are attached by screws with washers and then either overlapped and heat sealed together or, if they are butted together, overlapped by an additional strip and also heat sealed together.

However, fastening by means of mechanical fastening systems has the disadvantage that the papers vibrate as a result of wind forces and here, in particular, as a result of suction forces of the wind when the wind blows over them, and thus corresponding tensile forces act on the points of attachment and the particularly stressed edge area. The building papers may be torn and loosened at their points of attachment in the case of a corresponding building height, surface, and force acting on them, et cetera.

Synthetic roofing and building papers preferably are used in flat roof construction in the case of commercial buildings but also in the area of private building construction. In the case of public facilities, in particular, these papers are subject to a large number of permit and suitability regulations. There are national and international regulations, building authorities, building officials, permit and licensing officials, such as, for example, DIN, BIS, ISO, ASTM, as well as regulations of insurance companies (in areas subject to hurricane and storm damage) such as the FMI in America which is to be strengthened in the future. These regulations require that the papers be fastened by means of more appropriate strengthening and/or reinforcement so that they meet the corresponding permit criteria without entailing an increase in the production costs or changing the existing system.

The task of the present invention is to develop a special fabric of the above-mentioned type which is a universal product to be produced without great expense for strengthening and/or reinforcing construction papers and, in particular, increasing their tear propagation resistance in the edge area considerably.

In order to solve this task, an edge area is to be connected with a basic fabric in which the woof threads and/or the warp threads are reinforced.

This means that the basic fabric is loaded equally altogether, as usual it being possible to make the basic fabric from organic fiber materials such as polyester, polyamide, polyacryl, et cetera, or also from inorganic fiber materials such as glass. These textile articles exist as fleece material, woven fabric, knitted fabric, netting, laid material, or the like.

Several possibilities are considered for strengthening the edge area. On the one hand it is possible to use stronger warp threads in the edge area. Further, warp threads from a different material which has a higher strength also may be used in the edge area. For example, if the basic fabric consists of polyester threads, the warp threads in the edge area may be made of aramid, which has a significantly higher strength. The same also obtains for carbon, glass, or steel fibers. Combinations of the individual fiber materials with one another also are possible.

In general, strengthening is not applicable for the warp threads but in the same sense it also may be used for the woof threads. In particular, this is the case when the woof threads form the edge area.

However, in the preferred specific embodiment the strengthening of the edge area is achieved by means of special weaving techniques. On the one hand, the warp, respectively woof, threads in the edge area may not consist only of an individual thread, but of a thread bundle. On the other hand, preferably also at least two adjacent threads are combined into a thread bundle so that there are larger open spaces between the threads in the edge area. These open spaces together with the strengthening of the threads by means of bundling prevent damage and also tearing in the case of high loads. It is sufficient to use the same number of fastening elements as before.

The strengthening of the edge area thus may be matched to the corresponding building papers depending upon the requirements by means of a different weaving technique, another material used, or another mixture, as well as a specific width. The requirements imposed are fulfilled by means of an exactly measured bundling of individual threads to thread bundles, in particular in the right and left edge area in the longitudinal and/or in the tranverse direction of the fabric as well as by means of choosing a specific width. For example, according to the FM I-90 test a paper 3.8 m×7.5 m has to withstand a pressure of 4.3 kPa for one minute without damage appearing. The FM I-90 Test will become mandatory for papers in the U.S.A. in the near future. On the other hand, current fabrics had to pass only the FM I-60 test, which meant that a paper 3.8 m×7.5 m had to withstand a pressure of 2.9 kPa for one minute without damage. With the edge barrier reinforcement in accordance with the invention, the FM I-90 test may be passed without damage.

Preferably, the fabrics in accordance with the invention are stabilized so that they cannot be displaced or deformed. For example, plastic, starch, or glue are used for the stabilization. In this case the stabilization of the fabric is to be carried out with a material which is matched to the respective material of the paper.

The fabric in accordance with the invention creates a strengthening and/or reinforcement which withstands significantly increased wind loads, in particular in the edge area. The fabric itself is foldable and rollable unchanged and is not negatively influenced in its effectiveness by lateral flexure.

Moreover, the fabric in accordance with the invention also may be produced by first producing a fabric paper with a multiple width of the desired fabric. The area reinforced in accordance with the invention then is found not only in the edge area of this fabric paper but also in the area of the width of the desired fabric. After producing this fabric paper, the fabric paper may be cut into the with of the desired fabric longitudinally so that a reinforced area located in the fabric paper is cut through. Again this forms fabrics the edge area of which is preferably reinforced on both sides.

Further advantages, features, and details of the invention result from the following description of preferred specific embodiments as well as with the use of the drawing; here, FIG. 1 shows a cross-section through a specific embodiment of a state-of-the-art roof covering;

FIG. 3 shows a top view of a section of a reinforcement in accordance with the invention in particular for synthetic roofing papers and construction papers.

Figure 1:
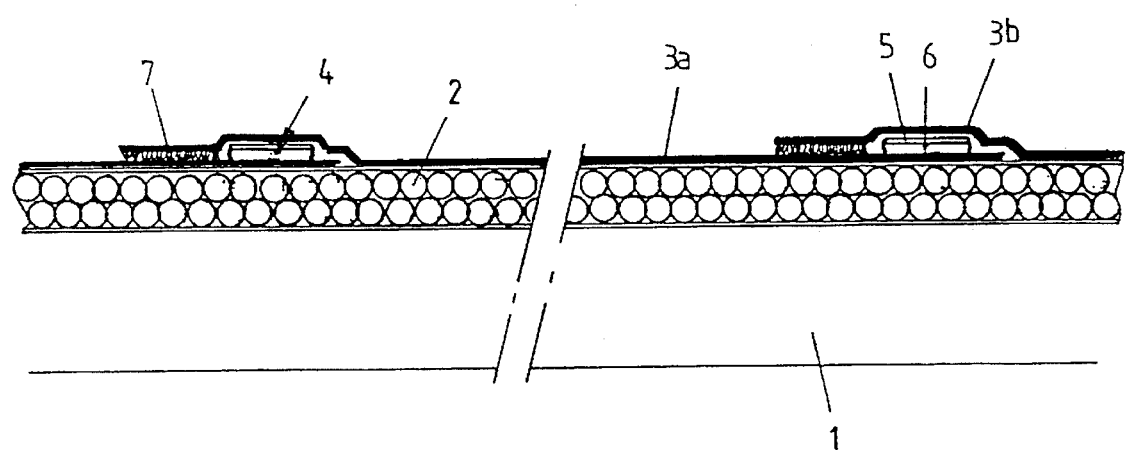
Figure 2:
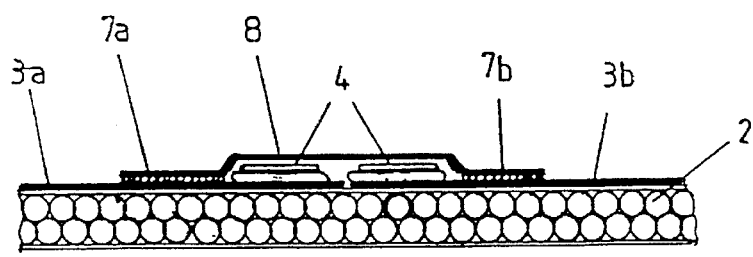
FIG. 2 shows a cross-section through a further specific embodiment of a state-of-the-art roof covering.

In the case of a conventional roof covering in accordance with FIGS. 1 and 2, for example, insulation 2 is applied to a concrete slab 1. This insulation 2 then is covered with synthetic roofing paper and building paper 3, which are laid in strips of different widths. In this case the individual strips 3a and 3b are overlapped in the edge areas as is shown in FIG. 1. It is possible to butt the strips together as shown in FIG. 2.

As a rules the edges of strips 3 are attached by means of mechanical fastening systems 4, for example those consisting of a screw 5 with a washer 6. In the overlapping areas the fastening systems 4 are overlapped by an edge area of the adjacent strip 3b, this strip being heat sealed in its edge area after the overlapping of the fastening system 4, as is indicated by number 7. Instead of heat sealing, gluing or the like may be performed.

If the strips 3a and 3b are butted together as in FIG. 2 and attached in their edge area by means of fastening systems in each case, these fastening systems 4 are overlapped by an additional covering strip 8, which again is connected on both sides of the fastening system 4 by means of heat sealing 7a and 7b with the strips 3a and 3b.

Since these synthetic roofing and building papers are subject to considerable loads, as a rule they are reinforced by means of a special fabric; a special fabric in accordance with the invention being shown in FIG. 3. These special fabrics then essentially consist of a main fabric area 11 and a reinforced edge area 12. Woof threads 13 run in the transverse direction and warp threads 14 in the longitudinal direction.

While in the specific embodiment shown the basic fabric 11 consists of individual crossing warp threads and woof threads, 13 resp. 14, it may be seen that the edge area 14 is essentially strengthened. In each case two adjacent woof threads 13a and 13b are bundled, producing larger open spaces 15 between the individual fibers.

Further, the warps in the edge area 12 no longer consist of individual warp threads but of fiber bundles 16. This forms a significantly strengthened edge area 12, which is considerably more resistant against mechanical loads.

We claim:

1. A fabric for strengthening and reinforcing flat-shaped articles, in particular of synthetic roofing and building papers, made of woof and warp threads, which together form a basic fabric having open areas, the improvement comprising:

the basic fabric is connected with an edge area wherein the woof threads and warp threads are strengthened by means of threaded bundles in the edge area which results in a strength sufficient to pass without damage Standard Test FM I-90.

2. A fabric according to claim 1 wherein at least two adjacent woof threads are brought together in the edge area.

3. A fabric according to claim 2 wherein the warp threads in the edge area comprise thread bundles.

4. A fabric according to claim 3 wherein the woof threads in the edge area have larger diameters than the remaining woof threads.

5. A fabric according to claim 1 wherein the open areas in the edge area are larger than in the main fabric.

6. A fabric according to claim 1 wherein the woof and warp threads are stabilized in the basic fabric and in the edge area.

7. A fabric according to claim 6 wherein the threads are stabilized with a material selected from the group consisting of plastics, starch, glue and mixtures thereof.

8. A fabric according to claim 7 wherein the material used for the stabilization of the basic fabric is matched to the material from which the flat-shaped article is formed.

9. A fabric for strengthening and reinforcing flat-shaped articles, in particular of synthetic roofing and building papers, made of woof and warp threads, which together form open areas, the improvement comprising:

the basic fabric is connected with an edge area wherein the woof threads and warp threads are strengthened by means of threaded bundles in the edge area which results in a strength sufficient to pass without damage Standard Test FM I-90.

10. A fabric according to claim 9 wherein at least two adjacent woof threads are brought together in the edge area.

11. A fabric according to claim 10 wherein the warp threads in the edge area comprise thread bundles.

12. A fabric according to claim 11 wherein the woof threads in the edge area have larger diameters than the remaining woof threads.

13. A fabric according to claim 9 wherein the open areas in the edge area are larger than in the main fabric.

14. A fabric according to claim 9 wherein the woof and warp threads are stabilized in the basic fabric and in the edge area.

15. A fabric according to claim 14 wherein the threads are stabilized with a material selected from the group consisting of plastics, starch, glue and mixtures thereof.

16. A fabric according to claim 15 wherein the material used for the stabilization of the basic fabric is matched to the material from which the flat-shaped article is formed.

* * * * *